United States Patent Office 3,399,165
Patented Aug. 27, 1968

3,399,165
RESIN BASE COATING COMPOSITIONS AND
METHOD OF USING THE SAME
Morris M. Berger, Irving L. Blumenfeld, and Milton Alfred Torbin, Pittsburgh, Pa., assignors to Deco Coatings Corp., Pittsburgh, Pa., a corporation of Pennsylvania
No Drawing. Filed May 2, 1966, Ser. No. 546,530
6 Claims. (Cl. 260—41)

ABSTRACT OF THE DISCLOSURE

A coating composition, suitable for application to polyethylene without previous surface treatment thereof and capable of curing at room temperature, is prepared by mixing polystyrene (molecular weight about 300–3000, about 54.2 to 78.3 parts), a copolymer of ethylene and vinyl acetate (17 to 39% acetate, about 45.8 to 21.7 parts), a suitable pigment (e.g., about 5 parts), and if desired a suitable extender, such as calcium carbonate, to control the finish obtained. Suitable pigments include Wachtung Red B, benzidene yellow, and phthalocyanine blue. Other extenders are barytes, clay, talc, and silicas. In decorating polyethylene articles, the step of drying the article for fifteen minutes to one hour after each application of ink is thus avoided.

---

This invention relates to coating composition and method of using the same, and more particularly to novel thermoresponsive coating compositions of the type adapted to produce a durable decorative imprint which does not require heat curing.

Although not limited thereto, the coating compositions of the present invention are particularly adapted to be applied to articles formed from polyethylene, for example, bottles, containers of various shapes, as well as sheet material.

As is known, polyethylene has a smooth waxy surface which is not particularly adapted to accept markings either in the form of labels, decals and the like, or in the form of conventional inks. Consequently, the surface of the polyethylene articles must be conditioned to accept the labels or inks. Surface conditioning may be accomplished, for example, by subjecting the surface to a corona discharge, to ozone, or to concentrated sulfuric acid. Each of the conditioning treatments renders the surface more polar and therefore more suitable for accepting the inks or labels.

Prior art inks suitable for coating or decorating polyethylene articles, consisted of from 15% to 45% by weight solids with attendant solvents, such as alcohol, mineral spirits, xylene, toluene and the like. In addition, these inks contained antioxidants, such as, hydroxyquinone, oximes and the like, as well as volatile plasticizers. Hence, one disadvantage of these prior art inks lies in the fact that decorative imprints applied with these inks required drying because of the presence of the solvents. That is to say, the decorated polyethylene articles were placed in a drying oven for a period of time sufficient to affect drying or curing of the inks. The drying temperature must, of course, be maintained well below the melting point of the polyethylene and consequently, an extended drying time of from about fifteen minutes to one hour is required.

Another disadvantage arises from the fact that these inks must be dried or cured. In this connection, it should be evident that the colors of a multicolored decorative imprint cannot be applied successively, that is, one right after the other. Each color must be dried or cured before the next color can be applied. Consequently, the rate at which multicolored decorative imprints can be applied to polyethylene is relatively low.

A good coating composition should produce a film having the following desirable properties. The film must achieve a good adhesion with the surface being decorated. It must be flexible enough to withstand bending so as not to crack or peel under either cold or hot conditions. It must not be tacky or sticky to the touch. Finally, it must be tough enough to resist wear. It should also be possible to modify the coating composition to produce a variety of film finishes.

Accordingly, as an overall object, the present invention seeks to provide novel coating compositions which are particularly adapted to be applied to articles formed from polyethylene, but which may also be applied to articles formed from other materials, such as, metals, glass and other plastics.

Another object of the persent invention is to provide novel coating compositions which may be applied to the unconditioned surfaces of polyethylene articles.

A further object of the present invention is to provide novel coating compositions which do not contain solvents or volatile liquids and which do not require drying or heat curing.

Still another object of the present invention is to provide novel thermoresponsive coating compositions of 100% solids material, whereby said coatings may be liquefied by the application of heat and when applied in their liquid state to the cooler surfaces of articles, set instantly to provide a durable decorative imprint.

A further object of the present invention is to provide novel coating compositions with which various colored imprints may be applied successively, without intermediate curing steps, to produce multicolored decorative imprints without fear of smearing or producing work of an imperfect nature.

Still another object of the present invention is to provide novel coating compositions particularly suitable for application as decorative imprints, wherein the decorative imprints achieve good adhesion with the surface being decorated; are flexible and tough; lack tack; and may have a variety of finishes ranging from dead flat to a high gloss.

Yet another object of the present invention is to provide a method for decorating workpieces using the coating compositions of the present invention.

The present invention resides in the discovery that admixtures of certain solid, thermoresponsive resinous materials and a solid pigment produce coating compositions which are extremely suitable for use in decorating articles formed from polyethylene, but which are also useful in decorating articles formed from other materials. In their normal state, the present coating compositions consist entirely of solid materials preferably in granular form, there being a noticeable absence of conventional solvents, volatile plasticizers and the like. The present coating compositions, when heated above room temperature, are of a thin paste-like consistency, particularly suited for application by conventional stencil screens, as film to the cooler surface of an article. When the hot film contacts the cooler surface, it sets or solidifies instantly and cures at room temperature. The resulting film is exremely durable and does no require drying or heat curing as do the coating compositions of the prior art.

Accordingly, the most outstanding characteristics of the present coating compositions are their ability to set instantly on contact with a cooler surface and their ability to cure at room temperature. The present coating compositions eliminate the need of a heat curing step and the production time involved therewith. This is particularly important in the case of polyethylene articles which, as is known, do not require heat treatment.

The present invention also resides in the discovery that the present coating compositions, while in a hot melt condition, can be sucessfully applied as a decorative imprint to polyethylene without any deleterious effects to the polyethylene. Furthermore, it has been found that the hot melt can be applied to a material at a temperature above the melting point of the material without deleterious effects to the material.

The present invention also provides a novel method for decorating plastic articles, wherein the coloring medium is melted, applied as film to the surface of a plastic article which is at room temperature, and allowed to set on contact with the cooler surface of the plastic article and cure at room temperature. The printing temperature of the coloring medium may be less than, equal to, or greater than the melting point of the plastic from which the article is formed. The present coating compositions are particularly suited for application, in the form of a film comprising a decorative imprint, to virgin polyethylene. However, it is to be undersood that the present coating compositions may be applied to other plastics as well as metals and glass, without heat curing.

The above and other objects and advantages of this invention will become apparent from the ensuing disclosure and appended claims.

In accordance with the present invention, a thermoresponsive vehicle is provided comprising an admixture of polystyrene and a resinous copolymer of ethylene-vinyl acetate. To this admixture, there is mixed a pigment of desired color whose quantity depends on the color intensity desired. To this admixture there is also added an extender pigment, selected from the class consisting of calcium carbonate, barytes, clay, talc and silicas, preferably in finely divided form. The extender pigment determines the finish of the applied coating. That is to say, a glossy finish is obtained when the extender pigment is present at low concentrations, whereas a flat finish is obtained when the extender pigment is present at higher concentrations.

As will become apparent from the following examples, the concentration of the ethylene-vinyl acetate copolymer, in the thermoresponsive vehicle, may be varied in the range of from about 21.7% by weight to about 45.8% by weight and is preferably present in the range of from about 28.5% to about 38.1% by weight based on the weight of the thermoresponsive vehicle. With respect to the copolymer itself, the amount of vinyl acetate may be varied in the range of from about 17% by weight to about 39% by weight of the total copolymer composition with the remainder being ethylene. It is preferred, however, that the vinyl acetate be present in the range of from about 27% to about 37% by weight of the total copolymer composition.

The polystyrene may be present in the range of from about 54.2% to about 78.3% by weight and preferably in the range of from about 63.1% to about 70.2% by weight based on the weight of the thermoresponsive vehicle. Although polystyrene of a molecular weight of 350 is preferred, it has been found that polystyrenes with molecular weights ranging from about 300 to 3000 are suitable for use in the present coating compositions.

Examples of pigments suitable for coloring the present coating compositions include a yellow pigment commonly known as benzidine yellow; a red pigment sold by Du Pont under the trademark Wachtung Red B; and a blue pigment commonly known as phthalocyanine blue. Mixtures of the above-named pigments may be employed to obtain virtually any color shade thereof.

As stated, the extender pigment determines the finish of the film applied to the article being decorated. That is, by increasing the concentration of the extender pigment, the finish may be varied from a high gloss to a dead flat finish. The extender pigment may be selected from the class consisting of calcium carbonate, barytes, clay, talc and silicas, and is employed in finely divided form, for example, with an average particle size of two microns.

EXAMPLES

The coating compositions of the present invention achieve all of the above-enumerated desirable properties. In addition, the present coating compositions are applied as a hot melt coating which sets or freezes instantly upon contacting a cooler surface and most important cures at room temperature. To demonstrate these qualities, variout compositions of ethylene-vinyl acetate copolymer, polystyrene, Wachtung Red B as the pigment, and calcium carbonate as the extender pigment, were prepared. Each of these compositions were heated to render them liquid and a one mill thick film was cast on virgin polyethylene. The cast film was allowed to harden and cure at room tempearture and then evaluated as to the above-enumerated properties.

Excellent results were obtained with a coating composition having the following formulation. The concentration of each component is given in percent by weight of the total admixture.

EXAMPLE I

Ethylene-vinyl acetate copolymer [1] _____ [2] 27.8 (33.3)
Polystyrene—M.W. 350 _____ [2] 55.6 (66.7)
Calcium carbonate _____ 11.1
Wachtung Red B pigment _____ 5.5

[1] 32% by weight vinyl acetate, remainder ethylene.
[2] Values in parentheses given in percent by weight based on combined weight of copolymer and polystyrene.

The resulting film was tough, lacked surface tack, had excellent resistance to flexing and achieved an excellent adhesion with the virgin polyethylene. No damage to the virgin polyethylene was noted. The film has a satin finish.

To determine the best printing temperature, a number of samples, having the formulation of Example I, were prepared. The printing temperature was varied from 175° F. to 326° F. approximately in 15-degree intervals. When considering the stencil screen material, a temperature of 220° F. was found to be most practical since at this temperature, a relatively good quality print was made and decoration could be carried out continuously without damage to the stencil screen. However, disregarding the stencil screen, the best printing temperature was found to be 326° F. It is to be remembered that the coating composition was applied to virgin polyethylene which has a melting point of 300° F. Consequently, the most surprising and unexpected result of the present invention lies in the fact that the present coating compositions may be applied to a plastic article at a temperature above the melting point of the plastic from which the article is made.

It was also found that the hardness of the film varied with the concentration of the polystyrene. That is, the film was soft at low concentrations of polystyrene and harder at higher concentrations of polystyrene. Furthermore, the adhesion achieved with the virgin polyethylene was affected by the concentration of the copolymer. That is, better adhesion was obtained at higher concentrations than at lower concentrations of copolymer.

In Table A, below, there is listed other coating compositions wherein the polystyrene is replaced by other resins. The concentration of the components is given in percent by weight. For the purposes of comparison, the concentrations of the components in the coating compositions listed in Table A are identical to the concentrations of the components of Example I.

TABLE A

| | Examples | | |
|---|---|---|---|
| | II | III | IV |
| Terpene phenolic resin | 55.6 | | |
| 100% alkyd resin | | 55.6 | |
| 100% saturated polyester resin | | | 55.6 |
| Ethylene-vinyl acetate copolymer [1] | 27.8 | 27.8 | 27.8 |
| Calcium carbonate | 11.1 | 11.1 | 11.1 |
| Wachtung Red B pigment | 5.5 | 5.5 | 5.5 |

[1] 32% by weight vinyl acetate, remainder ethylene.

The film produced with the coating composition of Example II had good film toughness and lacked surface tack. However, a poor adhesion with the virgin polyethylene resulted and, hence, the film did not resist flexing. This composition is unsuitable.

The film produced with the coating composition of Example III achieved a good adhesion with the virgin polyethylene and resisted flexing. However, the resulting film has poor toughness and a large amount of surface tack. This composition is unsuitable.

The film produced with the coating composition of Example IV was a tough film, lacked surface tack and resisted flexing, that is, did not crack. However, the film did not achieve a good adhesion with the virgin polyethylene and tended to peel off. This composition is also unsuitable.

Good results were also obtained with coating compositions having the formulations listed below in Table B. The concentrations of each component is given in percent by weight of the total admixture. The concentration of the calcium carbonate and the Wachtung Red B pigment was held constant since these components effect the appearance of the film and not the quality of the film. Concentrations in parentheses are given in percent by weight based on combined weight of copolymer and polystyrene.

TABLE B

| | Examples | | | |
|---|---|---|---|---|
| | V | VI | VII | VIII |
| Ethylene-vinyl acetate copolymer [1] | 38 (45.8) | 33 (39.8) | 23 (27.7) | 18 (21.7) |
| Polystrene, M.W. 350 | 45 (54.2) | 50 (60.2) | 60 (72.3) | 65 (78.3) |
| Calcium carbonate | 11 | 11 | 11 | 11 |
| Wachtung Red B pigment | 6 | 6 | 6 | 6 |

[1] 32% by weight vinyl acetate, remainder ethylene.

From Examples I and V to VIII, it can be seen that the polystyrene may be present from about 54..2% to about 78.3% of the total admixture of polystyrene and copolymer, while the resinous copolymer is present from about 21.7% to about 45.8% of the total admixture of polystyrene and resinous copolymer. Furthermore, the ratio of resinous copolymer to polystyrene may be varied from about 1:1.18 to about 1:3.61.

It was noted in the films produced from the formulations of Examples V to VIII, that as the concentration of the polystyrene was lowered, the ability of the film to resist wear decreased. On the other hand, as the concentration of the polystyrene was increased, the film became more brittle.

It has been found that best results are achieved when an ethylene-vinyl acetate copolymer is used wherein the vinyl acetate is present in the amount of 32% by weight of total copolymer. However, the ratio of ethylene to vinyl acetate may be varied, somewhat, to produce acceptable films. The Examples listed in Table C illustrate the useful range over which the ratio of ethylene to vinyl acetate may be varied. The concentration of the polystyrene, the calcium carbonate and the Wachtung Red B pigment was held constant.

TABLE C

| | Examples | | | | |
|---|---|---|---|---|---|
| | IX | X | XI | XII | XIII |
| Copolymer: | | | | | |
| Ethylene | 23.1 | 22.1 | 20.3 | 18.9 | 17.0 |
| Vinyl acetate | 4.7 (17) | 5.6 (20) | 7.5 (24) | 8.9 (27) | 10.8 (39) |
| Polystyrene, M.W. 350 | 55.6 | 55.6 | 55.6 | 55.6 | 55.6 |
| Calcium carbonate | 11.1 | 11.1 | 11.1 | 11.1 | 11.1 |
| Wachtung Red B pigment | 5.5 | 5.5 | 5.5 | 5.5 | 5.5 |

As indicated in brackets under each value of vinyl acetate in Examples IX to XIII, it can be seen that the amount of vinyl acetate, based on the resinous copolymer, may be varied from about 17% to about 39% by weight. It was noted that the adhesion between the film and the virgin polyethylene increased with increasing concentrations of vinyl acetate in the copolymer.

Varying the molecular weight of the polystyrene also effects the adhesion and the hardness of the resulting film. It has been found that polystyrene of a molecular weight of 350 produces the best results with respect to film adhesion and film hardness. However, the molecular weight of the polystyrene may be varied over a range, to produce acceptable films. For example, coating compositions having the formulation of Example I, were prepared wherein the polystyrene of molecular weight of 350 was replaced by polystyrenes of molecular weights of 300, 325, 400, 800, 1500 and 3000.

Polystyrenes of molecular weights below 350, produce films which are tacky, that is sticky to the touch, and are unsuitable at least for application to polyethylene. However, where an overcoat is to be applied to the film, the lower molecular weight polystyrenes are acceptable. Polystyrenes of molecular weights above 350, produce films which are acceptable. Polystyrenes much below a molecular weight of 300 and much above 3000 are not suitable for use in the present coating compositions.

Although the present invention has been shown in connection with certain specific example formulations, it will be readily apparent to those skilled in the art that various changes in composition may be made to suit requirements without departing from the spirit and scope of the present invention.

We claim as our invention:

1. A composition of matter for use in decorating articles of thermoplastic material, said composition being a homogeneous mixture consisting essentially of:
   about 45.8 to 21.7 parts by weight of a copolymer of ethylene and vinyl acetate containing about 17 to 39% by weight of said acetate,
   about 54.2 to 78.3 parts by weight of polystyrene having a molecular weight of about 300 to 3000, and
   an effective amount of compatible pigment.

2. A composition of matter for use in decorating articles of thermoplastic material, said composition being a homogeneous mixture consisting essentially of:
   about 45.8 to 21.7 parts by weight of a copolymer of ethylene and vinyl acetate containing about 17 to 39% by weight of said acetate,
   about 54.2 to 78.3 parts by weight of polystyrene having a molecular weight of about 300 to 3000, an effective amount of an extender selected from the group consisting of calcium carbonate, barytes, clay, talc, and silica, and
   an effective amount of a compatible pigment selected from the group consisting of Wachtung Red B, benzidine yellow, and phthalocyanine blue.

3. A composition of matter for use in decorating articles of thermoplastic material, said composition being a homogenous mixture consisting essentially of:
   about 27.8 to 37.8 parts by weight of a copolymer of ethylene and vinyl acetate containing about 17 to 39% by weight of said acetate,
   about 55.6 parts by weight of polystyrene having an average molecular weight of 350, about 11.1 parts by weight of calcium carbonate, and about 5.5 parts by weight of Wachtung Red B pigment.

4. A method of providing articles of polyethylene with a non-tacky, adherent, decorative imprint, said method comprising the step of applying to said polyethylene article a composition of matter in the form of a melt at a temperature exceeding the melting point of said polyethylene, said composition of matter being a homogeneous mixture consisting essentially of:
  about 45.8 to 21.7 parts by weight of a copolymer of ethylene and vinyl acetate containing about 17 to 39% by weight of said acetate,
  about 54.2 to 78.3 parts by weight of polystyrene having a molecular weight of about 300 to 3000, and
  an effective amount of a compatible pigment.

5. A method of providing articles of polyethylene with a non-tacky, adherent, decorative imprint, said method comprising the step of applying to said polyethylene article a composition of matter in the form of a melt at a temperature exceeding the melting point of said polyethylene, said composition of matter being a homogeneous mixture consisting essentially of:
  about 45.8 to 21.7 parts by weight of a copolymer of ethylene and vinyl acetate containing about 17 to 39% by weight of said acetate,
  about 54.2 to 78.3 parts by weight of polystyrene having a molecular weight of about 300 to 3000, an effective amount of an extender selected from the group consisting of calcium carbonate, barytes, clay, talc, and silica, and
  an effective amount of a compatible pigment selected from the group consisting of Wachtung Red B, benzidine yellow, and phthalocyanine blue.

6. A method of providing articles of polyethylene with a non-tacky, adherent, decorative imprint, said method comprising the step of applying to said polyethylene article a composition of matter in the form of a melt at a temperature exceeding the melting point of said polyethylene, said composition of matter being a homogeneous mixture consisting essentially of:
  about 27.8 to 37.8 parts by weight of a copolymer of ethylene and vinyl acetate containing about 17 to 39% by weight of said acetate,
  about 55.6 parts by weight of polystyrene having an average molecular weight of 350,
  about 11.1 parts by weight of calcium carbonate,
  and about 5.5 parts by weight of Wachtung Red B pigment, said method being characterized by the absence of a step of roughening the surface of said polyethylene article prior to the application to said article of said composition of matter.

References Cited

UNITED STATES PATENTS 3,256,228  6/1966  Tyran _____ 260—897
3,294,722  12/1966  Apikos et al. _____ 260—28.5

OTHER REFERENCES

Styrene, Boundy and Boyer, Reinhold Publishing Corp., 1952, TP 986. S7.

ALLAN LIEBERMAN, *Primary Examiner.*

S. L. FOX, *Assistant Examiner.*